United States Patent

Schafer

[15] 3,701,871
[45] Oct. 31, 1972

[54] APPARATUS FOR INDUCTIVE LONGITUDINAL OR HELICAL SEAM WELDING OF TUBULAR METALLIC WORKPIECES

[72] Inventor: Hans Schafer, Erlangen, Germany

[73] Assignee: Siemens Aktiengesellschaft, Berlin and Munich, Germany

[22] Filed: March 10, 1971

[21] Appl. No.: 122,889

[30] Foreign Application Priority Data

March 13, 1970 Germany..........P 20 11 915.7

[52] U.S. Cl. ..............219/8.5, 219/10.53, 219/10.79
[51] Int. Cl. ..............................................H05b 9/02
[58] Field of Search......219/8.5, 10.53, 10.75, 10.79, 219/10.71, 10.43

[56] References Cited

UNITED STATES PATENTS

| | | | |
|---|---|---|---|
| 3,248,512 | 4/1966 | Sommer | 219/8.5 |
| 2,938,993 | 5/1960 | Rudd | 219/8.5 X |
| 3,242,300 | 3/1966 | Osborn | 219/8.5 |
| 3,562,470 | 2/1971 | Bobart | 219/10.61 X |

Primary Examiner—J. V. Truhe
Assistant Examiner—B. A. Reynolds
Attorney—Curt M. Avery, Arthur E. Wilfond, Herbert L. Lerner and Daniel J. Tick

[57] ABSTRACT

An apparatus for inductive longitudinal or helical seam welding of tubular metallic workpieces has a tube roller device for advancing a tubular workpiece shaped from a metal band so as to have a V-shaped gap between the butt faces of the band. The roller device also applies pressure to the workpiece for joining the butt faces. The apparatus has a longitudinal inductor and a second ring-shaped inductor disposed between the longitudinal inductor and the location whereat the butt faces are joined. The longitudinal inductor is located above the V-shaped gap in partially overlapping relation to the gap edges and has longitudinal iron yoke sheet metal members in proximity to the edges. The longitudinal inductor has two component parts one of which overlaps one of the gap edges and the other part overlaps the opposite edge of the V-shaped gap. Current supply conductors form respective windings for the two conductor parts. Each of the windings is arranged above a portion of the tube surface corresponding adjacent to the gap edge overlapped by the corresponding one of the component inductor parts.

4 Claims, 2 Drawing Figures

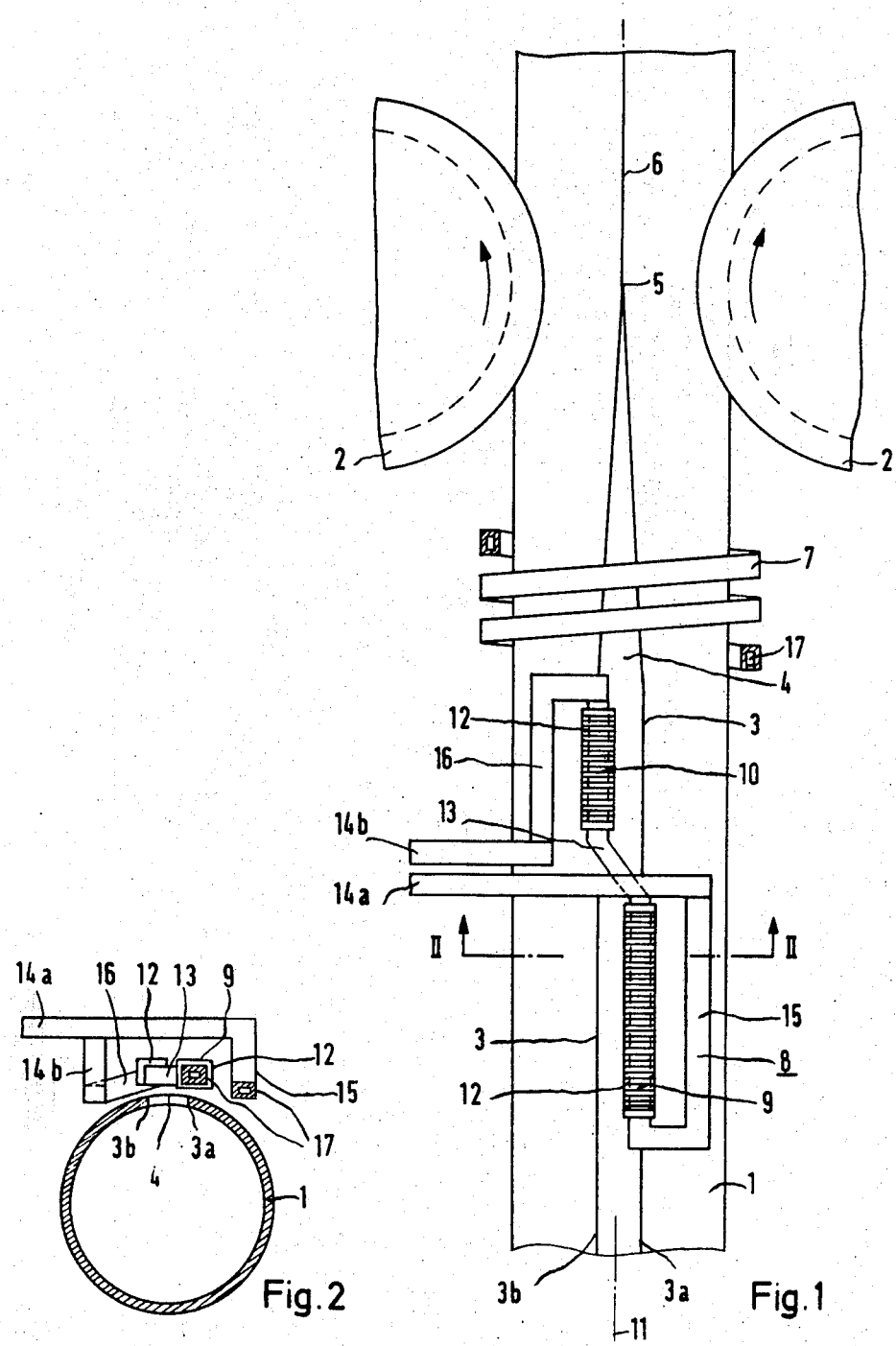

APPARATUS FOR INDUCTIVE LONGITUDINAL OR HELICAL SEAM WELDING OF TUBULAR METALLIC WORKPIECES

My invention relates to an apparatus for inductive longitudinal or helical seam welding of tubular metallic workpieces wherein a roller device is provided for advancing the tubular member. The tubular workpiece is shaped from a metal band so as to have a V-shaped gap between the butt faces of the band. The roller device also applies pressure to the workpiece for joining the butt faces. The apparatus includes a longitudinal inductor and a second ring shaped inductor disposed between the longitudinal inductor and the location whereat the butt faces are joined. The longitudinal inductor is located over the V-shaped gap so that the outer edges of the gap are practically overlapped thereby. In the region of the gap the longitudinal inductor is provided with iron yoke sheet metal members.

An apparatus of this type is known for example from U.S. Pat. No. 3,248,512. With such an apparatus the welding temperature for the welding operation at the location where the butt faces are joined is developed with the ring-shaped inductor at joining location. With the inductive preheater, the edge effect is reduced since the gap edges and the butting surfaces of the V-shaped gap are separately heated. However, it is a disadvantage that with the preheating of the gap edges, a greater temperature gradient occurs between the butting faces and/or between the gap edges and the remaining metal band. The heat therefore flows rapidly away and there is formed at the butting edges only a small heat reserve. Therewith there exists the danger of a seam weld hardening which in general must be treated with a subsequent heat treatment.

Accordingly, it is an object of my invention to provide a tube welding apparatus of the aforementioned type wherein weld seam hardening is prevented.

According to a feature of my invention I provide a seam welding apparatus having a longitudinal inductor which includes two component parts. One of the parts overlaps one of the edges of the V-shaped gap and the other component part overlaps the other edge of the gap. The current supply conductors form respective windings for the component parts. Each of the windings is arranged above a portion of the skin region adjacent to the gap edge overlapped by the corresponding one of the component parts.

Preferably and according to a further feature of the invention the two component parts are arranged one behind the other in a direction substantially parallel to the longitudinal axis of the tubular workpiece, the component parts being located to one side of the location whereat the butt faces of the tubular conductor are joined. The component part closest to the joining location is shorter than the other component part.

By means of the windings which is provided for each component part of the longitudinal conductor, there are respective ring currents induced in the skin regions of the tube at both sides of the V-shaped gap which acts to heat the surface of the tube. Since the magnitude of the heat current, in addition to the unchangeable material conditioned factors, is dependent on the temperature difference, the heat runoff from the butting edges into the metal band is thereby reduced and the heat stored at the gap edges is increased. Therefore, hardening of the weld seam no longer occurs. Accordingly, with the apparatus of the invention time consuming and costly subsequent treatments of the welded tube are precluded.

Since the longitudinal inductor is divided into two component parts, it is well suited for adaption in a simple manner to the gap geometry, for example, to small gaps which correspond to tubes of low and medium quality. In addition, by means of the division of the longitudinal inductor into parts with the respectively different lengths there is obtained the result that the temperature of both gap edges are heated to the same degree when the tube advances into the welding zone whereat the tube is heated by the ring-shaped inductor to the welding temperature.

The apparatus of the invention also has advantages with respect to apparatus of the kind described in German printed Pat. application No. 1,099,664. In this known apparatus the inductive preheater lies in the V-shaped gap. Accordingly, a heat store in the gap edges does not form with this arrangement. In addition, the longitudinal inductor arranged in the gap is technically difficult to obtain.

The invention will now be described with reference to the drawings wherein:

FIG. 1 illustrates a schematic diagram of a seam welding apparatus according to the invention; and FIG. 2 is a view, partially in section, of the apparatus of FIG. 1 taken along line II—II.

FIG. 1 illustrates a tube welding apparatus according to the invention in plan view. A tube 1 preformed from a metal band is moved forward and pressed together by the pressure rollers 2. A V-shaped gap 4 is defined by the butting edges 3. The butting edges 3 are heated to the welding temperature and the apertaining butt surfaces are pressed together by pressure rollers 2 at the contact point 5 to form a welded seam 6.

A ring-shaped inductor 7 is provided for developing the welding temperature, the inductor being fed with a high frequency current having a frequency of approximately 200 to 450 Kilohertz. By means of this inductor 7, a ring current is developed in preformed tube 1 which heats the upper and low edges of the gap very quickly. A longitudinal inductor 8 which is likewise fed with a high frequency current is placed ahead of the ring-shaped inductor 7. The field of the longitudinal inductor 8 penetrates into the gap 4 and heats also the middle regions of the butting surfaces to a temperature which lies below the welding temperature. Thereby, in the shortest possible time and with a small expenditure of high frequency energy, the butting edges and butting surfaces are brought to the intermediate state between the solid state and liquid state and a press welding is obtained with substantially increased welding speed. Consequently, the production of the apparatus is substantially increased.

The longitudinal inductor 8 comprises two component parts 9 and 10 which are arranged one behind the other with reference to the tubular axis 11. Both parts 9 and 10 are provided with iron yoke sheet metal members 12. The component part 9 of the longitudinal inductor is arranged over the edge 3a of the V-shaped gap 4 and the component part 10 is arranged over the edge 3b of the gap 4 laying opposite the edge 3a. The two parts 9 and 10 are joined by a conductor member 13 so that the entire longitudinal inductor 8 has the form of an off-set conductor.

The two parts 9 and 10 are so arranged over the respective gap edges 3a and 3b so that they preferably extend with half their width over the gap 4. The field of the component parts 9 and 10 extends into the gap 4 and heats the butting surfaces in addition to the edges 3a and 3b. The component part 10 positioned next to the welding location 5 is shorter than the part 9 placed further distant from the location 5. In this way there is obtained the effect that the temperature of the edges and butting surfaces are approximately of the same magnitude when the tube enters the region of the ring-shaped inductor 7.

From FIG. 1 it is directly apparent that the longitudinal inductor is in a simple manner fitted to the gap geometry because of the division of the longitudinal inductor 8 into the two component parts 9 and 10. For example, with the longitudinal inductor of the invention, efficaciously permits heating the small V-shaped gaps which are associated for example with tubes having a small diameter and, as in most instances, a small wall thickness.

It should be noted that the inductor of the invention is not limited to the illustrated form, for example, the component parts 9 and 10 can be positioned partially or entirely next to each other.

With the current supply means 14a and 14b for this longitudinal inductor 8, each component part 9 and 10 is provided with windings 15 and 16 respectively. These windings 15 and 16 lie over a part of the skin regions of the preformed tube 1 which border on gap edges 3a and 3b respectively. With these windings 15 and 16 a ring current is generated in the respective skin regions of the tube and the surface of the preformed tube 1 is heated in the region of the edges 3a and 3b. With this additional heating, as already mentioned, the heat store in the region of the butting edges 3a and 3b is increased and the danger of a seam weld hardening is prevented, that is, a subsequent heat treatment of the welded tube is prevented.

FIG. 2 illustrates a section of the apparatus of FIG. 1 taken along line II—II. In order not to obscure the view, the ring-shaped inductor 7 and the pressure rollers 2 are omitted from FIG. 2.

FIG. 2 illustrates the configuration of the current supply means 14a and 14b. In addition, FIG. 2 shows the spacing or separation of the windings 15 and 16 from the skin regions of the preformed tube 1. With this separation, the coupling and thereby the intensity of the ring current is adjustable in the skin regions of the tube 1. The coupling distance is thereby in a last instance responsible for the heating of the surface, and therefore, for the heat stored in the edges 3a and 3b and the appertaining butting faces. The coupling distance is determined in dependence upon: the nature of the material, the tube diameter, the thickness of the tube wall, and the welding speed.

The longitudinal inductor 8 as well as the ring-shaped inductor 7 are provided with a cooling channel 17 for water cooling. The cooling channel 7 of the longitudinal inductor 8 is illustrated in FIG. 2 and the cooling channel 17 of the ring-shaped inductor 7 is illustrated in FIG. 1. The cooling channels of the longitudinal inductor 8 as well as the cooling channels of the ring-shaped inductor 7 can be joined together as a single cooling channel.

While the invention has been described by means of a specific example and in a specific embodiment, I do not wish to be limited thereto, for obvious modifications will occur to those skilled in the art according to the spirit and scope of the invention.

I claim:

1. Apparatus for inductive seam welding of tubular metallic workpieces, comprising a tube roller device for advancing a tubular workpiece shaped from a metal band so as to have a V-shaped gap between the butt faces of the band, said roller device applying pressure to the workpiece for joining said butt faces, a first longitudinal inductor, a second ring-shaped inductor disposed between said longitudinal inductor and the location whereat said butt faces are jointed, said longitudinal inductor being located above said V-shaped gap in partially overlapping relation to the gap edges, said longitudinal inductor having iron yoke sheet metal members in proximity of said edges; said longitudinal inductor comprising two component parts located above said V-shaped gap, one of said two parts overlapping one of said gap edges, said other part overlapping the opposite edge of said V-shaped gap and both of said parts being interconnected by a conductor member located above said V-shaped gap; current supply conductors which form respective windings for said two component parts, each of said windings being arranged above a portion of the tube surface adjacent to the gap edge overlapped by the corresponding one of said component parts.

2. Apparatus according to claim 1, said component parts overlapping said gap to an extent corresponding to approximately half the width of said parts.

3. Apparatus according to claim 1, said longitudinal inductor having a cooling channel disposed therein.

4. Apparatus for inductive seam welding of tubular metallic workpieces, comprising a tube roller device for advancing a tubular workpiece shaped from a metal band so as to have a V-shaped gap between the butt faces of the band, said roller device applying pressure to the workpiece for joining said butt faces, a first longitudinal inductor, a second ring-shaped inductor disposed between said longitudinal inductor and the location whereat said butt faces are joined, said longitudinal inductor being located above said V-shaped gap in partially overlapping relation to the gap edges, said longitudinal inductor having iron yoke sheet metal members in proximity of said edges; said longitudinal inductor comprising two component parts, one of said two parts overlapping one of said gap edges, said other part overlapping the opposite edge of said V-shaped gap; current supply conductors which form respective windings for said two component parts, each of said windings being arranged above a portion of the tube surface adjacent the gap edge overlapped by the corresponding one of said component parts, said component parts being arranged one behind the other so as to extend in a direction substantially parallel to the longitudinal axis of the tube, said component parts being located to one side of said location whereat said butt faces are joined, the component part lying closet to said location being shorter than the other component part.

* * * * *